United States Patent
Eriksen

(10) Patent No.: US 10,982,506 B2
(45) Date of Patent: Apr. 20, 2021

(54) ELECTROMECHANICALLY OPERATED DOWNHOLE VALVE ACTUATOR

(71) Applicant: Electrical Subsea & Drilling AS, Straume (NO)

(72) Inventor: Egil Eriksen, Ål (NO)

(73) Assignee: Electrical Subsea & Drilling AS, Straume (NO)

( * ) Notice: Subject to any disclaimer, the term of this patent is extended or adjusted under 35 U.S.C. 154(b) by 240 days.

(21) Appl. No.: 16/303,626

(22) PCT Filed: May 18, 2017

(86) PCT No.: PCT/NO2017/050122
§ 371 (c)(1),
(2) Date: Nov. 20, 2018

(87) PCT Pub. No.: WO2017/204654
PCT Pub. Date: Nov. 30, 2017

(65) Prior Publication Data
US 2020/0308929 A1    Oct. 1, 2020

(30) Foreign Application Priority Data

May 21, 2016  (NO) .................................. 20160852
Apr. 5, 2017  (NO) .................................. 20170567

(51) Int. Cl.
*E21B 34/06*    (2006.01)
*E21B 34/14*    (2006.01)
(Continued)

(52) U.S. Cl.
CPC ............ *E21B 34/066* (2013.01); *E21B 34/14* (2013.01); *F16H 25/20* (2013.01); *F16K 1/2007* (2013.01);
(Continued)

(58) Field of Classification Search
CPC .... E21B 34/066; E21B 34/14; E21B 2200/05; F16H 25/20; F16H 2025/2078; F16K 31/047; F16K 1/2007
See application file for complete search history.

(56) References Cited

U.S. PATENT DOCUMENTS 5,070,944 A    12/1991  Hopper
6,619,388 B2 *  9/2003  Dietz ................... E21B 34/066
                                                              166/332.8
(Continued)

FOREIGN PATENT DOCUMENTS

| GB | 2240376 A1 | 7/1991 |
|---|---|---|
| WO | 2006048616 A1 | 5/2006 |
| WO | 2013119127 A1 | 8/2013 |

OTHER PUBLICATIONS

Norwegian Search Report dated Dec. 12, 2016 for Application No. 20160852.
(Continued)

*Primary Examiner* — Eric Keasel
(74) *Attorney, Agent, or Firm* — Patterson + Sheridan, LLP

(57) ABSTRACT

A valve arranged to close a flow path extending through it, on the loss of an electrical voltage supplied to a driving motor of an actuation element, the driving motor, which comprises a stator and a rotor, being arranged to, via transmission elements, displace the actuation element between at least a first position, in which the actuation element is arranged at a distance from a spring-loaded, rotatable valve element, and a second position, in which the actuation element holds the spring-loaded, rotatable valve element in an open position, the rotor of the driving motor surrounding and being connected to a roller nut which is provided with a number of supported thread rollers which are distributed around and are threadedly engaged with the (Continued)

actuation element, the actuation element being a flow pipe which forms a flow path and is axially displaceable away from its second position by means of an actuator spring.

6 Claims, 3 Drawing Sheets

(51) Int. Cl.
 *F16H 25/20* (2006.01)
 *F16K 1/20* (2006.01)
 *F16K 31/04* (2006.01)
(52) U.S. Cl.
 CPC ........ *F16K 31/047* (2013.01); *E21B 2200/05* (2020.05); *F16H 2025/2078* (2013.01)

(56) References Cited

U.S. PATENT DOCUMENTS

2007/0295515 A1 12/2007 Veneruso et al.
2009/0250206 A1 10/2009 Lake et al.

OTHER PUBLICATIONS

Norwegian Search Report dated Nov. 3, 2017 for Application No. 20170567.
International Search Report and Written Opinion dated Jul. 21, 2017 for Application No. PCT/NO2017/050122.
International Preliminary Report on Patentability dated Mar. 26, 2018 for Application No. PCT/NO2017/050122.

\* cited by examiner

ELECTROMECHANICALLY OPERATED DOWNHOLE VALVE ACTUATOR

The invention relates to a valve arranged to close a flow path extending through it, on the loss of an electrical voltage supplied to a driving motor for an actuation element, the driving motor, which comprises a stator and a rotor, being arranged to, by way of transmission elements, move the actuation element between at least a first position, in which the actuation element is arranged at a distance from a spring-loaded, rotatable valve element, and a second position, in which the actuation element holds the spring-loaded, rotatable valve element in an open position, the rotor of the driving motor surrounding and being connected to a roller nut which is provided with a number of supported thread rollers which are distributed around and are in threaded engagement with the actuation element.

For wells that can produce by their own energy, most countries have compulsory use of downhole, fail-safe safety valves. Until now, hydraulically operated downhole valves have been used in well completions. The safety valve is opened and kept open by hydraulic pressure driving an actuator piston and, at the same time, tensioning an actuator spring. If the operator or the safety system vents the hydraulic pressure, or the hydraulics supply is interrupted in some other manner, the safety valve will close by spring force.

The use of flap valves for such purposes is commonly known. A known structure includes an axially displaceable flow pipe placed in a valve housing as an actuation element for the valve flap. The upper portion of the flow pipe is provided with an external, annular, hydraulic piston section. Sliding seals on the piston seal against a cylindrical seal surface internally in the valve housing during the actuator stroke. Between the bottom face of the hydraulic piston and a lower, internal partition wall, which divides the valve housing into an upper hydraulic section and a lower valve chamber, the flow pipe is surrounded by an actuator spring in the annular space between the flow pipe and the valve housing. The lower portion of the flow pipe extends sealingly through an opening in the partition wall, which is provided with a valve seat on its underside. When the actuator spring is relaxed and is holding the flow pipe in the upper position, the valve flap, which is spring-loaded, is closed against the valve seat.

A downhole safety valve is not to be opened against the pressure from the reservoir without pressure balancing, because the pressure difference across the valve flap will be too large. The normal procedure when opening a downhole valve includes either pumping in fluid from above or balancing the pressure by means of a self-equalizing function in the valve. Self-equalizing valves have greater complexity and less reliability than conventional valves, as the self-equalizing function introduces another possible leakage path.

When the hydraulic piston area of the flow pipe is pressurized, the flow pipe is pushed through the opening in the partition wall, towards its lower extreme position in the valve chamber, while the actuator spring is being compressed. Firstly, the flow pipe pushes the valve flap away from the valve seat, the valve flap pivoting at its mounting, and, finally, it is held in its open position against the outside of the flow pipe. When the valve flap has been opened, the flow pipe forms a flow path through the valve.

The flow pipe is pushed to its retracted, upper position by the tensioned actuator spring when the hydraulic pressure in the actuator is vented. As the lower end of the flow pipe passes the spring-loaded valve flap, the latter swings, by means of the spring pressure, back towards the valve seat from its open position. The well pressure sealingly presses the valve flap against the valve seat.

The need for electromechanically actuated downhole valves is connected to the development of "electrified" control systems for well equipment in underwater production systems. Hydraulic actuators are replaced with electromechanical ones. The main objective of this is to reduce costs of long, so-called umbilicals on the seabed and to avoid problems connected with the distribution of hydraulic fluid across large distances. Other advantages of the technology are zero emissions of hydraulic fluid, better condition monitoring, better control of choke valves, et cetera.

There are solutions for local, underwater power generation for hydraulic operation of downhole valves, which can be combined with electromechanical operation of the rest of the equipment installed on the wellhead. However, it is desirable to have electromechanical operation of the downhole valve as well. In addition to complicating additional equipment being avoided when the entire control system is based on the same technology, there are depth restrictions and other drawbacks of the hydraulic operation of downhole valves that can be overcome by electromechanical operation:

1. The safety valve is typically placed a few hundred metres below the wellhead, but it may be desirable to install it deeper in the well than what is usual, for example to handle hydrate problems, or to avoid losing the well-flow barrier through shallow landslides/slope failures on the seabed. From a safety point of view, it is beneficial to install the safety valve as near the reservoir as possible, so that a smaller portion of the production tubing will be exposed to well pressure upstream of the valve. However, there are depth restrictions connected to hydraulic downhole valves.

Fail-safe closing of hydraulic downhole valves happens by hydraulic pressure being bled off while, at the same time, the hydraulic piston is being pushed back by a return spring. The closing time is affected by a volume of pressurized hydraulic fluid being evacuated through a return path in the form of long small-diameter tubes. Electromechanical valves do not have this limitation. If the holding current to a brake in an electromechanical system is turned off, the valve will close faster than with the use of hydraulics in that a de-energized electromotor and associated transmission elements are pushed back by the return spring. Since the electromotor can be run both ways, it is also possible to close the downhole valve with a controlled course. This is an advantage in relation to hydraulically actuated valves, which will only close by means of spring force when the hydraulic actuator pressure has ceased via a return path.

In a hydraulic downhole valve, the spring force must overcome hydrostatic pressure from the hydraulic fluid on the depth of installation of the valve and also friction forces in the valve to bring about fail-safe closing of the valve. The deeper the valve has been installed, the higher the hydrostatic pressure from the hydraulic fluid will be and the stronger the spring must be. There is limited room for the spring in the annular space between the flow pipe and the valve housing, which in its turn is restricted by the diameter of the casing of the well. In an electromechanically actuated downhole valve, the actuator spring is not to push back a hydraulic piston. With smaller forces for effecting fail-safe closing of the valve, a weaker and thereby less space-demanding spring can be used and the dimensioning of the spring in an electromechanical downhole By great depths and high pressure in the reservoir, the hydraulic operational pressure will be very high. A challenge with this is to get dynamic seals on the hydraulics piston to keep tight. With electromechanically actuated downhole valves, this problem is avoided.

2. The risk of hydraulic system leakages is eliminated with an electromechanical downhole valve.
3. Quality deterioration of hydraulic fluid owing to temperature influence, aging and intermixture of foreign particles, water, et cetera, in the hydraulic fluid is avoided.

In addition to the drawbacks and limitations connected to the hydraulic operation of the actuator being eliminated, better control and monitoring of the valve operation are achieved with electromechanical operation. Additional instrumentation can be implemented in the valve if that is desirable.

U.S. Pat. No. 5,070,944A discloses an electromechanical actuator adapted for use on, for example, a downhole safety valve, in which an annular motor, a harmonic gearing system and a two-part, axially movable drive sleeve bring about axial movement of an actuator sleeve and also a releasable solenoid coupling which can prevent the drive-sleeve parts from rotating relative to each other. Rotation of the driving motor in one direction brings the actuator into its starting position; rotation in the opposite direction actuates the equipment held in position by means of the coupling. When the current to the coupling is cut off, the coupling will release.

WO2013119127A1 discloses an electromechanical actuator for underwater use in the petroleum industry, in which, via transmission elements, an electric annular motor, which includes a stator and a rotor, is arranged to move an actuation element between at least a first position and a second position, and in which the rotor surrounds and is connected to an actuator nut which is in threaded engagement with the actuation element. The actuation element is typically arranged to manoeuvre gripping elements or the like arranged at a distance from the annular motor.

The invention has for its object to remedy or reduce at least one of the drawbacks of the prior art or at least provide a useful alternative to the prior art.

The object is achieved through the features, which are specified in the description below and in the claims that follow.

An electromechanically operated actuator operates a downhole, fail-safe flap valve in a valve housing by means of an axially displaceable flow pipe, which functions as an actuation element for the valve flap and forms a path through the valve when this is open.

In an upper chamber in the valve housing are arranged an electric, annular driving motor, with at least a stator and a rotor, and transmission elements which drive the flow pipe parallel to the rotational axis of the driving motor while the flow pipe is prevented from rotating relative to the valve housing. The transmission elements consist of a rotatable roller nut, which is attached to the rotor and is provided with a number of supported threaded rollers which are distributed around and are in threaded engagement with a threaded sleeve surrounding and being attached externally on the flow pipe.

The driving motor is designed and dimensioned to provide a high torque. The rotor is provided with at least one locator, which, via connection to and signal processing in a control system, gives accurate information on the relative position of the actuation element in the actuator. The actuating force exerted on the actuation element by the driving motor is controlled and measured by adjusting the power supplied.

The actuator is provided with an electronics unit, which is connected to a cable for power supply and communication to a control system. The electronics unit is connected to the electromotor of the valve, an electromechanical brake, which can hold the valve in the open position, and possibly various sensors, et cetera, which may appropriately be included in the actuator. Downhole instrumentation for measuring pressure and temperature and other parameters may be integrated in the valve. The same cable gland can be used for both signal transmission and power supply.

The solution with threaded rollers that are in engagement with the threaded sleeve externally on the flow pipe is known from SKF's catalogues, for example, and can be adapted to the actuator and form machine elements in which relatively large forces can be transmitted with relatively little friction between the machine elements.

The lower portion of the flow pipe is sealingly surrounded by an opening in a partition wall in the actuator housing which divides the actuator housing into an upper, liquid-filled and pressure-compensated chamber for the driving motor, transmission elements and an actuator spring and a lower chamber for the flap valve. Between an abutment collar encircling the flow pipe and the upper side of the partition wall between the chambers, the flow pipe is surrounded by an actuator spring in the annular space between the flow pipe and the valve housing. When the actuator spring is relaxed, the flow pipe is held in the upper position and the valve flap, which is provided with a spring in the hinging, is closed against a valve seat on the underside of the partition wall.

When, via transmission elements, the driving motor pushes the lower end of the flow pipe through the opening in the partition wall, the actuator spring is compressed. During the first part of the movement of the flow pipe, the end of the flow pipe pushes the spring-loaded, hinged flap from the closed position until it is held open tensioned against the flow pipe in the annular space between the valve housing and the flow pipe. The flow pipe is pushed further, until the lower end rests sealingly against a seal face in the lower portion of the valve chamber and the flow pipe forms a path through the open valve.

The electromechanical brake is attached to the valve housing by a first portion and to the rotor of the driving motor by a second portion. When the valve flap is in the fully open position, with the return spring tensioned, the brake is activated by means of the control system, by electrical voltage being applied to a magnet coil of the brake so that the two portions are held in mutual engagement in a rotation-preventing manner. Then the power supply to the driving motor may be cut off.

The flow pipe is moved in a fail-safe manner to the upper position by the actuator spring if the holding current to the brake is cut off, or is broken by a failure. Thereby, the de-energized electromotor and the roller nut may rotate freely, driven by the actuator spring.

As the lower end of the flow pipe passes the flap, the latter swings towards the valve seat from its tensioned open position. As the driving motor may be run both ways, the valve can also be closed in a controlled manner after the brake has been released. The well pressure presses the flap sealingly against the valve seat in the closed position.

The invention relates, more specifically, to a valve arranged to close a flow path extending through it, on the loss of an electrical voltage supplied to a driving motor of an actuation element, the driving motor, which comprises a stator and a rotor, being arranged to, via transmission elements, displace the actuation element between at least a first position, in which the actuation element is arranged at a distance from a spring-loaded, rotatable valve element, and a second position, in which the actuation element holds the spring-loaded, rotatable valve element in an open position, the rotor of the driving motor surrounding and being connected to a roller nut which is provided with a number of supported threaded rollers which are distributed around and are in threaded engagement with the actuation element, characterized by the actuation element being a flow pipe which forms a flow path and is axially displaceable away from its second position by means of an actuator spring.

The actuator spring may surround a portion of the actuation element and may rest in an axially supporting manner against a shoulder on the actuation element and an opposite upper wall surface of a partition wall in a valve housing.

The driving motor and the actuator spring may be arranged in a pressure-compensated chamber provided with a pressure compensator, which is arranged to equalize a pressure difference between said chamber and the flow path.

The shoulder may be formed on an abutment collar encircling a portion of the flow path.

The valve housing may be provided with a closable port for pressure-compensation fluid to be filled into the upper chamber.

The actuation element may be connected to an electromechanical brake, which is arranged to hold the actuation element axially fixed at least in the second position of the actuation element.

The valve housing may be provided with a seal element arranged to abut sealingly against an end portion of the actuation element when the actuation element has been displaced into its second position.

In what follows, an example of a preferred embodiment is described, which is visualized in the accompanying drawings in which.

Figure 1:
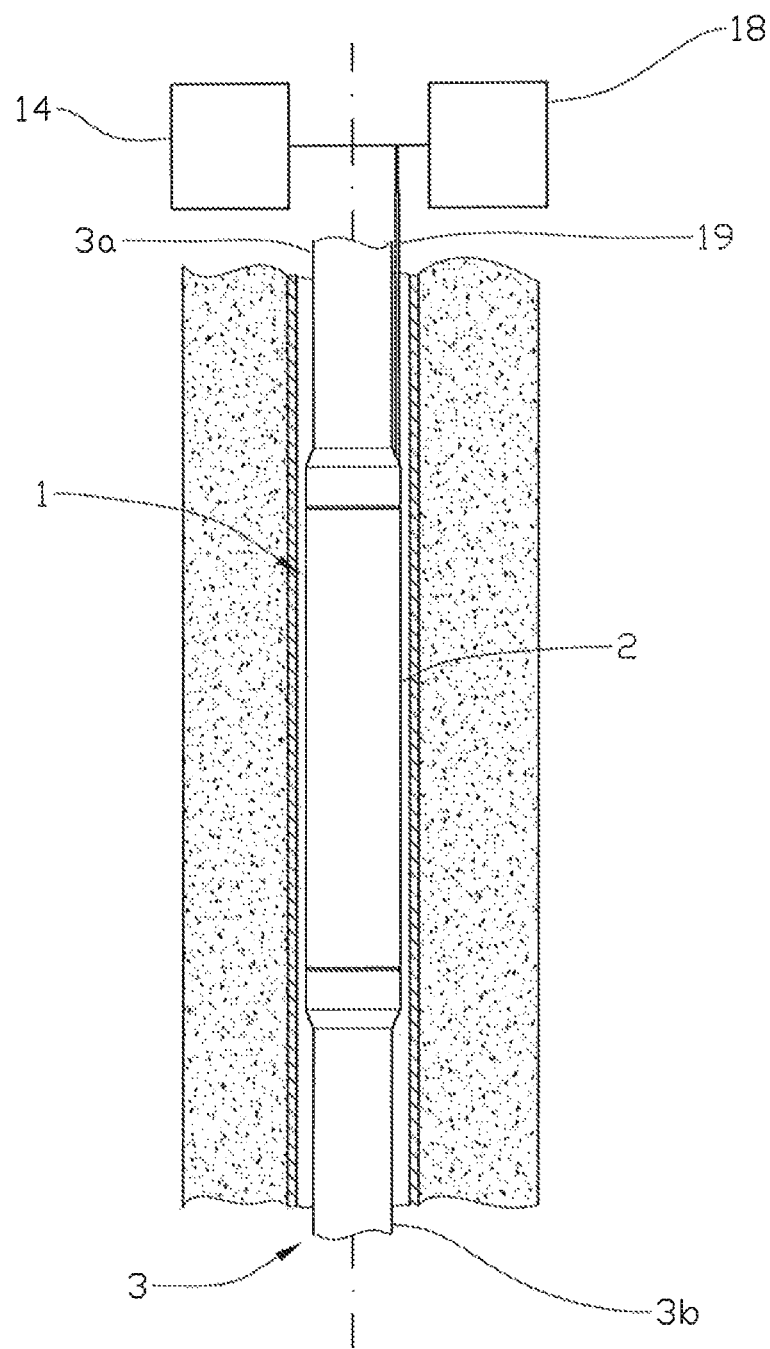
FIG. 1 shows a downhole valve in a pipe-completion string in a wellbore.

Reference is first made to FIG. 1, in which the reference numeral 1 indicates an electromechanically operated, failsafe downhole valve in a valve housing 2 arranged between upper and lower portions 3a, 3b of a pipe-completion string 3.

A control system 14 and a power source 18 are connected to the valve housing 2 via a cable 19.

Figures 2, 2A:
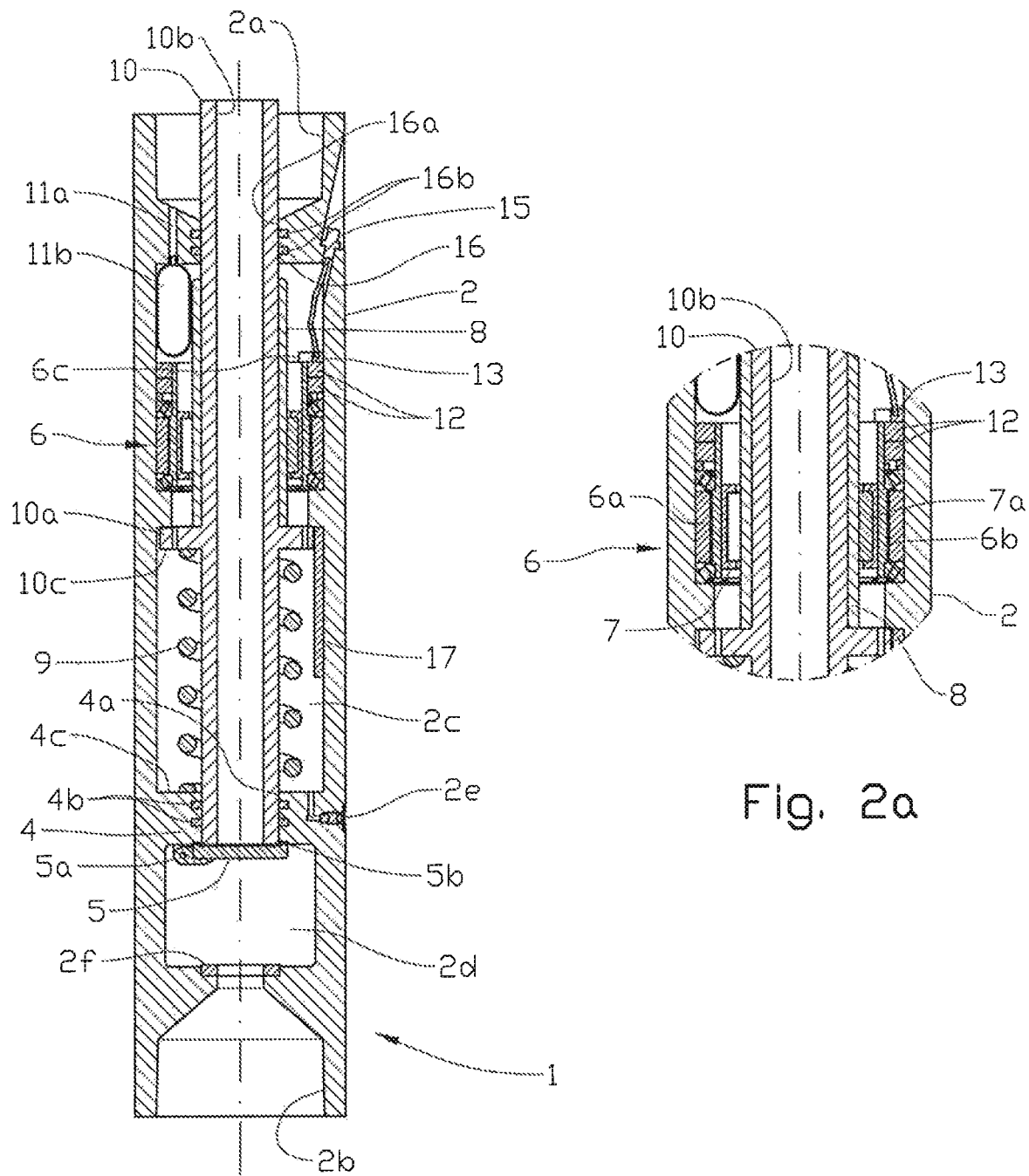
FIG. 2 shows, on a larger scale, an axial section through the downhole valve in the closed position.
FIG. 2a shows a section of FIG. 2.

Reference is now made to FIGS. 2 and 2a.

In upper and lower end portions, the valve housing 2 is provided with internally threaded portions 2a and 2b for releasable integration into the pipe-completion string 3.

Internally in the lower portion of the valve housing 2, a partition wall 4 with a through opening 4a provided with seals 4b is arranged. The partition wall 4 divides the valve housing 2 into an upper, pressure-compensated chamber 2c which is filled with a compensation fluid, for example silicone oil or transformer oil, and a lower valve chamber 2d. The valve chamber 2d communicates with the production fluid in the pipe-completion string 3 below the downhole valve 1 and accommodates a spring-loaded valve element 5, shown here as a side-hinged valve flap. The pressure-compensated chamber 2c is bounded towards the upper end portion of the valve housing by an upper barrier wall 16 with a through opening 16a provided with seals 16b.

In the upper chamber 2c are positioned an electric, annular driving motor 6, including a stator 6a and a rotor 6b, transmission elements 7, 8 and an actuator spring 9. Here, the transmission elements consist of a rotatable roller nut 7 which is attached to the rotor 6b and is provided with a number of supported thread rollers 7a which are distributed around and are in threaded engagement with an actuation element 10 formed as a flow pipe with a flow path 10b extending through it, arranged to put the upper and lower portions 3a, 3b of the pipe-completion string 3 into fluid-communicating connection with each other. The actuation element 10 is preferably provided with a threaded sleeve 8 surrounding and being attached externally on the actuation element 10 and forming an externally threaded portion on the actuation element 10. An upper end portion of the flow pipe 10 extends through the opening 16a of the barrier wall 16, and a lower end portion of the flow pipe 10 extends into the opening 4a of the partition wall 4. The seals 16b and 4b, respectively, abut in a fluid-sealing manner against the periphery of the flow pipe 10. The flow pipe 10 is axially movable by means of the driving motor 6 and works as an actuation element for opening the spring-loaded valve flap 5 in the lower chamber 2d. The rotor 6b and the actuator nut 7 are rotatably supported inside the upper, pressure-compensated chamber 2c.

A compensation opening 11a connects a pressure compensator 11b in the upper chamber 2c to the bore of the pipe-completion string 3 on the top side of the valve 1 to enable equalization of a pressure difference between the upper chamber 2c and the pipe-completion string 3 and the flow path 10b. The valve housing 2 is provided with a port 2e for pressure-compensation fluid to be filled into the chamber 2c.

An electromechanical brake 12 is attached by a first portion to the valve housing 2 and attached by a second portion to the rotor 6b of the driving motor 6. When the valve flap 5 is in its fully open position with the return spring 9 tensioned, the brake 12 may be activated via an electronics unit 13 which is placed in the chamber 2c and is connected to a control system 14 via a cable connection 15. The brake 12 is activated by the application of electrical voltage to a magnet coil in the brake 12 from the power source 18 so that the two portions of the brake 12 hare held in rotation-preventing mutual engagement (details not shown). The control system 14 is arranged to make the driving motor 6 de-energized when the brake 12 has been applied.

In FIGS. 2 and 2a, the flow pipe 10 is shown in its first, upper position, in which the lower portion of the flow pipe 10 has been pulled away from the valve flap 5 and the lower end is sealingly surrounded by the opening 4a in the lower partition wall 4 of the valve housing 2. The upper portion of the flow pipe 10 projects through and is sealingly surrounded by the opening 16a in the upper barrier wall 16 in the valve housing 2, where the seal 16b is sealing against production fluid in the pipe-completion string 3 on the top side of the downhole valve 1.

An actuator spring 9, shown here as a helical spring, surrounds the lower portion of the flow pipe 10 and rests supportingly against a shoulder 10c on the flow pipe 10, shown here as a shoulder 10c formed on an abutment collar 10a encircling the flow pipe 10, and against an upper wall surface 4c of the partition wall 4.

The actuator spring 9 holds the flow pipe 10 in its upper position while the valve flap 5, which is provided with a spring 5a arranged to pivot the valve flap 5 towards a valve seat 5b encircling the opening 4a in the partition wall 4, is keeping the opening 4a closed.

The abutment collar 10a of the flow pipe 10 engages in a rotation-preventing manner with an anti-rotation rail 17 arranged axially on the wall of the upper chamber 2c.

Figures 3, 3A:
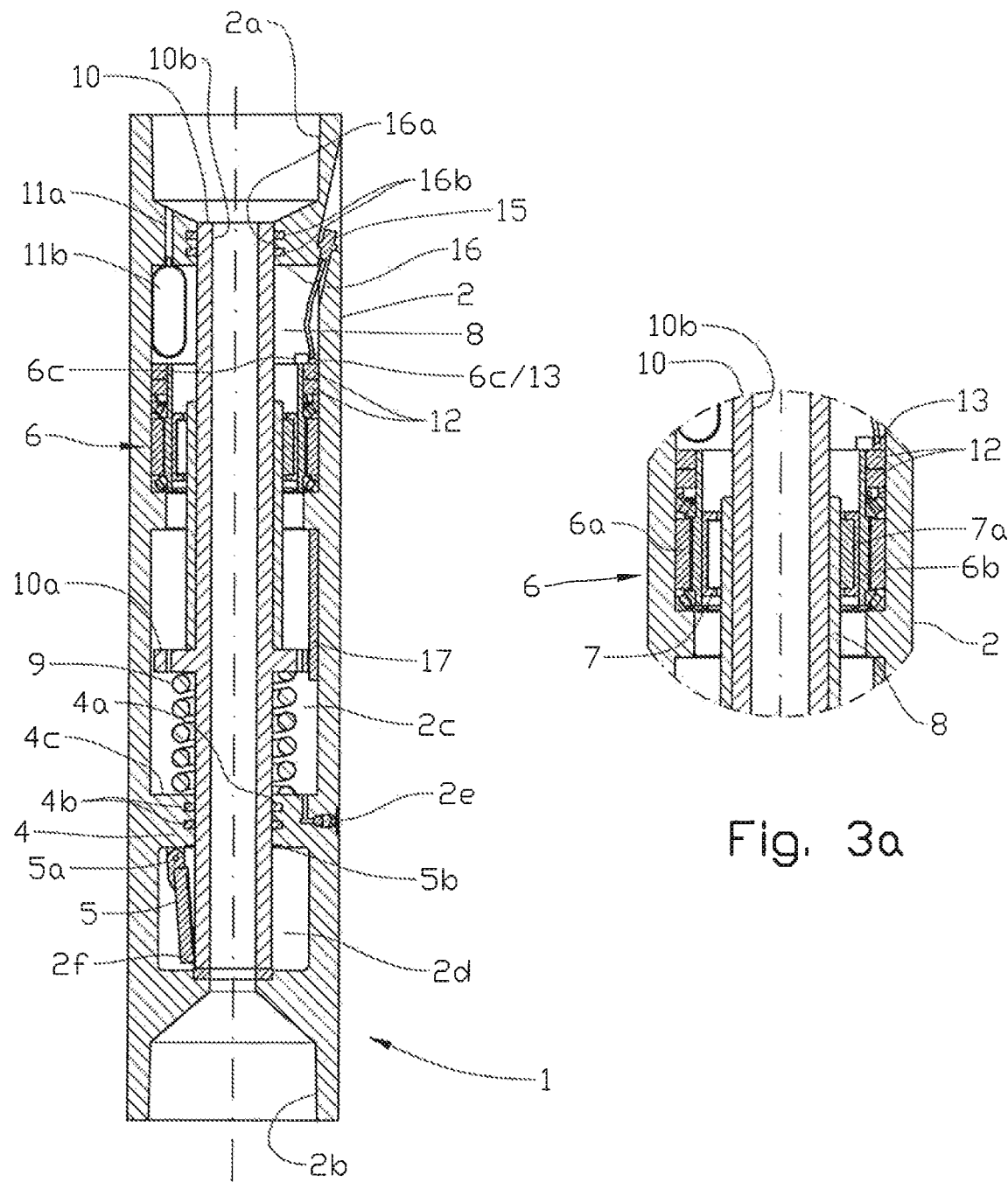
FIG. 3 shows an axial section through the downhole valve in the open position.
FIG. 3a shows a section of FIG. 3.

Reference is now made to FIGS. 3 and 3a.

When the roller nut 7 is rotated around the longitudinal axis of the valve 1, the thread rollers 7a are rotated around the threaded sleeve 8, whereby the flow pipe 10 is moved axially along the anti-rotation rail 17 in the upper chamber 2c to a second position, the lower portion of the flow pipe 10 being moved through the opening 4a in the partition wall 4 into the valve chamber 2d while the actuator spring 9 is being compressed between the upper side of the partition wall 4 and the shoulder 10c on the abutment collar 10a encircling the flow pipe 10.

By the displacement of the flow pipe 10 towards its second position, the spring-loaded valve flap 5 is pivoted away from the valve seat 5b by the lower end of the flow pipe 10. When the lower end of the flow pipe 10 has passed the valve flap 5, this is held open tensioned against the flow pipe 10 by the spring 5a in the annular space formed in the lower valve chamber 2d between the valve housing 2 and the flow pipe 10.

The flow pipe 10 is moved further down in the valve chamber 2d to its second position, the end of the flow pipe 10 being in sealing abutment against a seal element 2f in the lower end portion of the valve housing 2 and forming a portion of an open flow path through the valve 1.

The flow pipe 10 is moved in a fail-safe manner to the upper position by the tensioned actuator spring 9 if a loss of electrical voltage results in the brake 12 being deactivated and the driving motor 6 and the roller nut 7 being freely rotatable. As the lower end of the flow pipe 10 passes the valve flap 5 on its way up, the latter will pivot by means of the force of the spring 5a towards the valve seat 5b from its tensioned open position in the annular space between the valve housing 2 and the flow pipe 10. The well pressure subjects the valve flap 5 to further pressure into sealing abutment against the valve seat 5b.

As the driving motor 6 can be run both ways, it is also possible to close the valve flap 5 in a controlled manner.

The power supply of the valve 1 from the power source 18 and signal communication with the control system 14 run via the cable 19 and the cable connection 15. The driving motor is preferably provided with at least one locator 6c which, via signal processing in the control system 14, gives information on the positions of the flow pipe 10 and valve flap 5 in the downhole valve 1. The actuation force exerted by the driving motor 6 on the flow pipe 10 via the transmission elements 7, 8 is controlled and measured by means of the power supply from the power source 18.

It should be noted that the above-mentioned embodiment illustrates the invention, but does not limit it, and persons skilled in the art may construct many alternative embodiments without departing from the scope of the attached claims. In the claims, reference numbers in brackets are not to be regarded as restrictive. The use of the verb "to comprise" and its different forms does not exclude the presence of elements or steps that are not mentioned in the claims. The indefinite article "a" or "an" before an element does not exclude the presence of several such elements.

The fact that some features are indicated in mutually different dependent claims does not indicate that a combination of these features cannot be used with advantage.

The invention claimed is:

1. A valve arranged to close a flow path extending therethrough, on the loss of an electrical voltage supplied to a driving motor of an actuation element, the driving motor, which comprises a stator and a rotor, being arranged to, via transmission elements, displace the actuation element between at least a first position, in which the actuation element is in a retracted, upper position allowing a spring-loaded, pivotal valve element, to close against a valve seat, and a second position, in which the actuation element holds the spring-loaded, pivotal valve element in an open position, the rotor of the driving motor surrounding and being connected to a roller nut which is provided with a number of supported thread rollers which are distributed around and are threadedly engaged with the actuation element, wherein the transmission elements comprise the roller nut and the supported thread rollers, wherein the actuation element is a flow pipe which forms a flow path and is axially displaceable away from its second position by means of an actuator spring, and wherein the driving motor and the actuator spring are arranged in a pressure-compensated chamber provided with a pressure compensator which is arranged to equalize a pressure difference between the chamber and the flow path.

2. The valve according to claim 1, wherein the actuator spring surrounds a portion of the actuation element and rests in an axially supporting manner against a shoulder on the actuation element and an opposite upper wall surface of a partition wall in a valve housing.

3. The valve according to claim 2, wherein the shoulder is formed on an abutment collar encircling a portion of the flow pipe.

4. The valve according to claim 1, wherein the valve housing is provided with a closable port for pressure-compensation fluid to be filled into the pressure-compensated chamber.

5. The valve according to claim 1, wherein the actuation element is connected to an electromechanical brake which is arranged to hold the actuation element axially fixed at least in the second position of the actuation element.

6. The valve according to claim 1, wherein a valve housing is provided with a seal element arranged to abut sealingly against an end portion of the actuation element when the actuation element has been moved to its second position.

* * * * *